(12) United States Patent
Naoi

(10) Patent No.: US 6,351,263 B1
(45) Date of Patent: *Feb. 26, 2002

(54) IMAGE PROCESSOR WHICH MANUALLY AND INDEPENDENTLY DESIGNATES PROCESSING PARAMETERS FOR CHARACTER DATA AND IMAGE DATA

(75) Inventor: Kazuya Naoi, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/637,591

(22) Filed: Apr. 25, 1996

Related U.S. Application Data

(63) Continuation of application No. 08/097,206, filed on Jul. 27, 1993, now abandoned.

(30) Foreign Application Priority Data

| | | |
|---|---|---|
| Jul. 28, 1992 | (JP) | 4-201407 |
| Jun. 22, 1993 | (JP) | 5-150648 |

(51) Int. Cl.$^7$ .............................................. H04N 1/60
(52) U.S. Cl. ........................ 345/431; 358/406; 358/518
(58) Field of Search ................... 395/131; 364/571.01; 358/518–522, 462, 406; 345/431

(56) References Cited

U.S. PATENT DOCUMENTS

| | | | | |
|---|---|---|---|---|
| 4,671,661 A | | 6/1987 | Ott | 356/402 |
| 4,888,636 A | * | 12/1989 | Abe | 358/519 |
| 4,893,114 A | * | 1/1990 | Ishii | 345/22 |
| 4,903,145 A | | 2/1990 | Funada | 358/462 |
| 5,001,576 A | * | 3/1991 | Tanaka et al. | 358/462 |
| 5,081,523 A | * | 1/1992 | Frazier | 348/645 X |
| 5,103,298 A | * | 4/1992 | Kashimura et al. | 348/675 X |
| 5,103,303 A | * | 4/1992 | Shoji et al. | 358/500 |
| 5,113,251 A | * | 5/1992 | Ichiyanagi et al. | 358/500 |
| 5,155,589 A | * | 10/1992 | Gere | 358/518 X |
| 5,157,506 A | * | 10/1992 | Hannah | 358/518 X |
| 5,159,320 A | * | 10/1992 | Matsuo et al. | 345/203 |
| 5,237,401 A | * | 8/1993 | Koike et al. | 358/518 |
| 5,260,810 A | * | 11/1993 | Kanno et al. | 358/462 |
| 5,309,548 A | * | 5/1994 | Ohta et al. | 395/109 |
| 5,315,382 A | * | 5/1994 | Tanioka | 358/462 X |
| 5,331,442 A | * | 7/1994 | Sorimachi | 358/462 X |
| 5,333,069 A | * | 7/1994 | Spence | 358/517 |
| 5,343,233 A | * | 8/1994 | Abe | 358/518 X |
| 5,345,315 A | * | 9/1994 | Shalit | 358/521 X |
| 5,375,197 A | * | 12/1994 | Kang | 358/462 |
| 5,416,890 A | * | 5/1995 | Beretta | 345/431 |
| 5,422,738 A | * | 6/1995 | Ishihara et al. | 358/500 |
| 5,434,683 A | * | 7/1995 | Sekine et al. | 358/520 |
| 5,657,137 A | * | 8/1997 | Perumal, Jr. et al. | 358/502 |

FOREIGN PATENT DOCUMENTS

| | | | | |
|---|---|---|---|---|
| EP | 354791 | 2/1990 | | G06K/15/00 |
| EP | 388160 | 9/1990 | | G06K/15/00 |
| EP | 398763 | 11/1990 | | H04N/1/46 |

OTHER PUBLICATIONS

Foley et al., Computer Graphics: Principles and Practice, pp. 403–408, 1990.*

* cited by examiner

*Primary Examiner*—Joseph H. Feild
(74) *Attorney, Agent, or Firm*—Fitzpatrick, Cella, Harper & Scinto

(57) ABSTRACT

An image processor includes an operation panel at which color adjustments for image data are set. A generation device generates a pattern signal which represents a state related to the set color and image data representing a test image. A processor processes the image data representing the test image on the basis of the set color adjustment. The processed image data and the pattern signal are then output by an output device such as a color printer.

12 Claims, 17 Drawing Sheets

IMAGE PROCESSOR WHICH MANUALLY AND INDEPENDENTLY DESIGNATES PROCESSING PARAMETERS FOR CHARACTER DATA AND IMAGE DATA

This application is a continuation of application Ser. No. 08/097,206 filed Jul. 27, 1993, now abandoned.

BACKGROUND OF THE INVENTION

1. Field of the Invention

The present invention relates to an image processing apparatus and an image forming apparatus, capable of varying the print density.

2. Related Background Art

Color printing apparatus generally reproduce colors of a predetermined number, by mixing inks or toners of yellow (Ye), magenta (Mg), cyan (Cy) and black (Bk) colors in suitable proportions.

The conventional color printing apparatus are capable of regulating the proportions of these coloring materials, but lack the function of releasing the result of such regulation as a sample. The result of regulation can only be confirmed, therefore, by the actual printing of a suitable color image (or color characters).

Also the result of regulation of the print density of Y, M, C and Bk colors has not been reflected on the printed result of the color sample or the test print.

Conventionally there has not been a measure for evaluating the color change corresponding to a color regulation, because of the lack of technology therefor, so that the actual printing has had to be executed. Such situation is encountered not only in the color printing but also in the monochromatic printing.

SUMMARY OF THE INVENTION

An object of the present invention is to provide an image processing apparatus enabling easy density adjustment.

Another object of the present invention is to provide an image processing apparatus and an image forming apparatus enabling easier observation of the status of adjustment.

Still another object of the present invention is to provide an image processing apparatus and an image forming apparatus enabling easier observation of the status of color adjustment.

The above-mentioned objects can be attained, according to a preferred embodiment of the present invention, by an apparatus comprising setting means for setting a density with which an image is to be formed, generation means for generating test pattern signals including a pattern signal and a gray scale signal representing a state of the density set by the setting means, and process means for processing the test pattern signals, generated by said generation means, according to the setting by the setting means.

Still another object of the present invention is to provide an image processing apparatus and an image forming apparatus capable of satisfactory color reproductions respectively for characters and for other images.

Still another object of the present invention is to provide an image processing apparatus and an image forming apparatus with novel functions.

Still other objects of the present invention, and the features thereof, will become fully apparent from the following description of embodiments, to be taken in conjunction with the attached drawings.

DETAILED DESCRIPTION OF THE PREFERRED EMBODIMENTS

Figure 1:
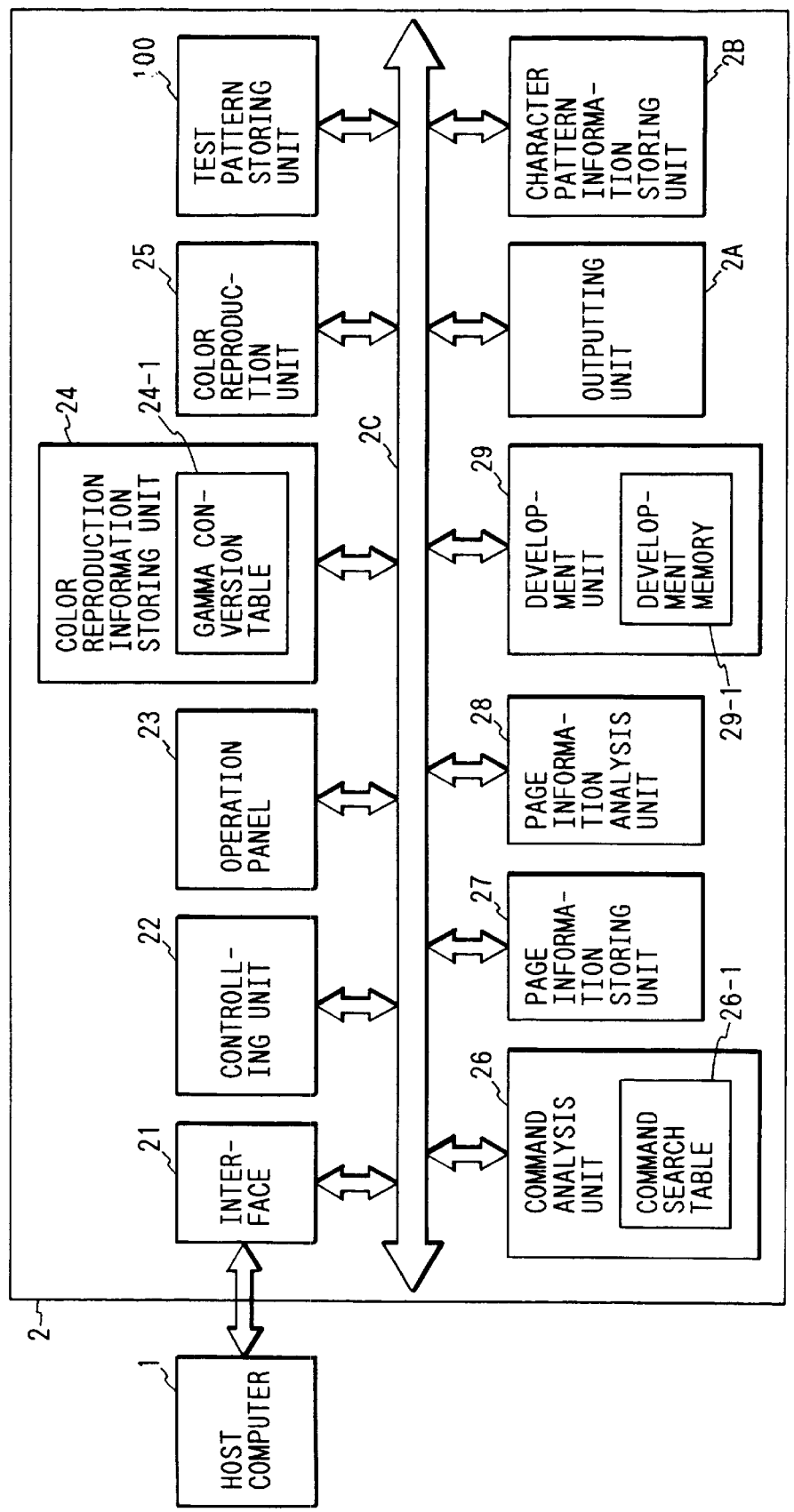
FIG. 1 is a block diagram of a printing apparatus constituting an embodiment of the present invention.

FIG. 1 is a block diagram of a printing apparatus constituting an embodiment of the present invention. The printing apparatus 2, provided with a microprocessor system including a ROM and a RAM, is connected to a host computer 1, which sends print data and print commands to the printing apparatus 2.

The printing apparatus 2 is also provided with an interface 21 for data exchange with the host computer 1; a control unit 22 for controlling the apparatus; an operation panel 23 for setting or varying printing parameters; a color reproducing information storage unit 24 for storing information necessary for color reproduction (gamma conversion table etc.); a color reproducing process unit 25; a command analysis unit 26 provided with a command search table 26-1 storing jump addresses to analysis programs corresponding to the command numbers of the print command transmitted from the host computer 1, and serving to analyze the print data and the print commands sent from the host computer 1 thereby generating information of a page developable in a development memory; a page information unit (RAM) 27 for storing thus analyzed information of a page; a page information analysis unit 28 for analyzing thus stored page information; a development unit 29 for data development in a development memory 29-1; an output unit 2A for forming a permanent visible image of the developed data on a recording sheet; a character pattern information unit 2B storing the information for developing character patterns; a data bus 2C; and a test pattern storage unit 100 for storing test pattern information as writing commands.

In the present embodiment, the page information storage unit 27 stores the color image information in the form of R, G and B data, while the development memory 29-1 stores Y, M, C and Bk data converted from the R, G and B data. It is also possible, however, to store the R, G and B data in the development memory 29-1 and to convert the data into the Y, M, C and Bk data immediately before the supply to the printer unit.

Figure 2:
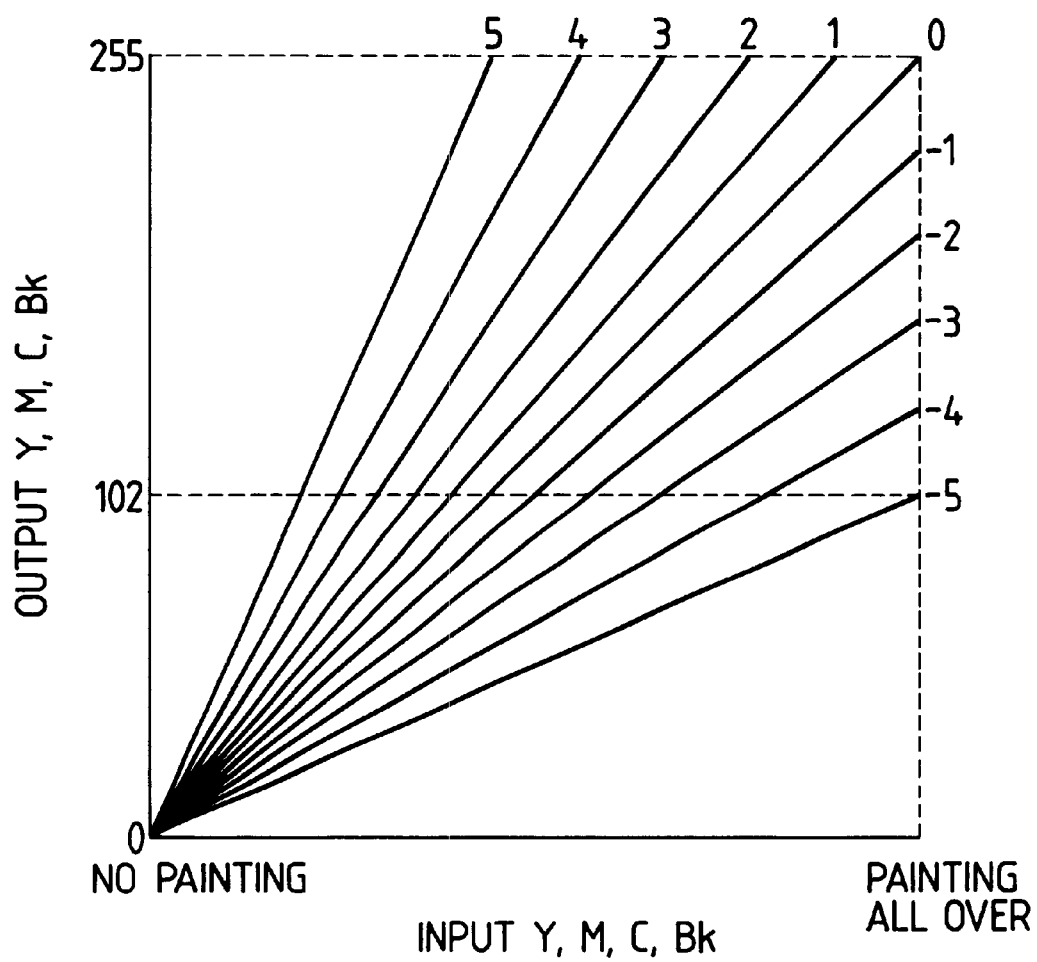
FIG. 2 is a chart showing various gamma conversion tables used for color adjustment.

FIG. 2 shows various gamma conversion tables in the color process unit. The table converts the input densities of Y, M, C and Bk, calculated in 256 levels from a non-printed state "0" to a solid printed state "255", into density information of Y, M, C and Bk of values from "0" to "255". For example in gamma characteristics "−5" shown in FIG. 2, in response to input Y, M, C, Bk signals corresponding to solid printed density, there are obtained output signals of a value "102", instead of the value "255" corresponding to the solid printed state. In this case, therefore, the colors are printed with a lower density in comparison with the input density. The color density adjustment is thus conducted by selecting a suitable gamma conversion table for the input density, thereby varying the output density.

Figure 3:
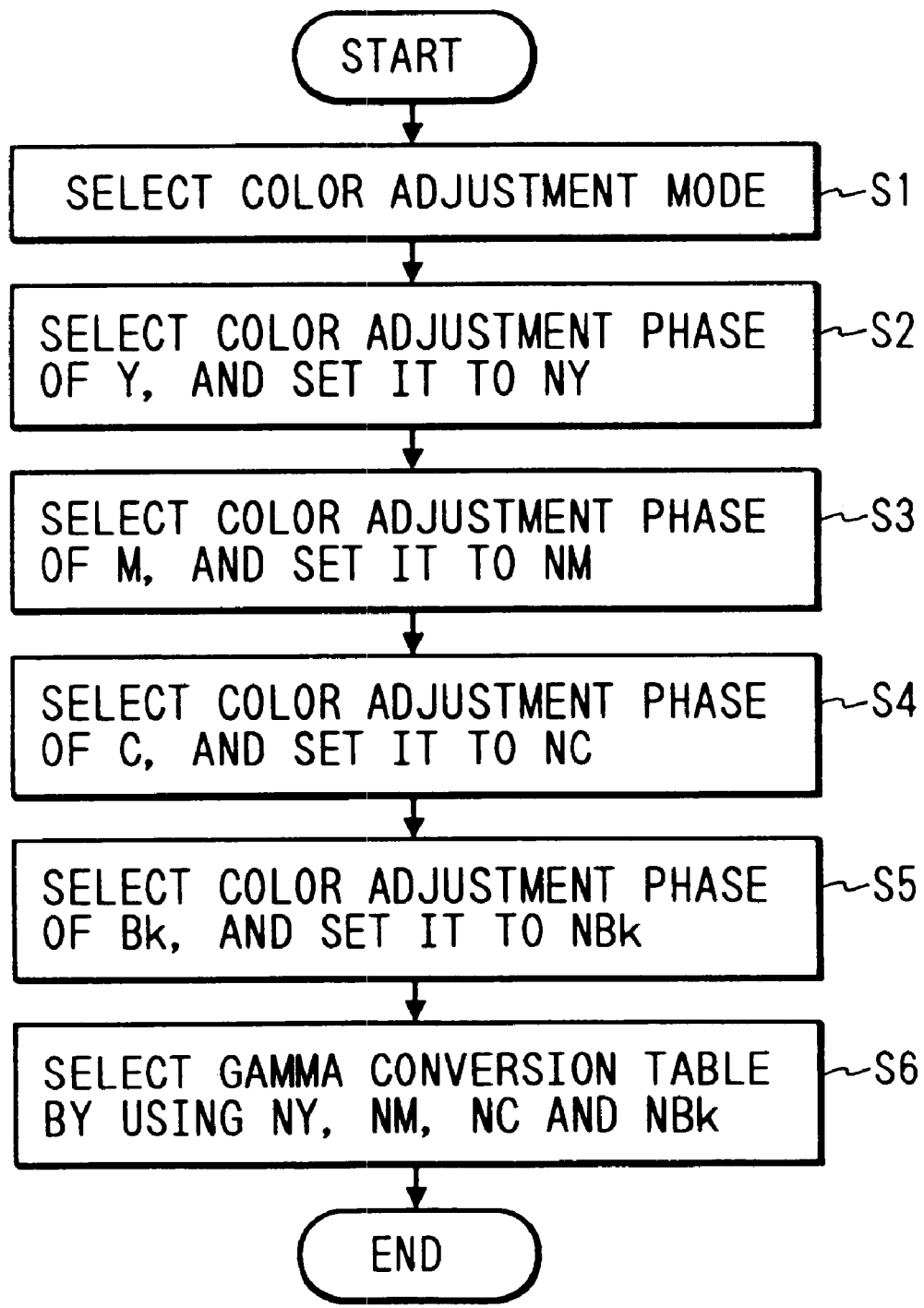
FIG. 3 is a flow chart for setting color adjustment phases from a panel.

FIG. 3 is a flow chart for setting, in a printing apparatus with color adjusting function, the color adjustment values of four colors Y, M, C and Bk from the operation panel 23. A step S1 selects the color adjustment mode from the panel 23; a step S2 selects the color adjustment level of Y and sets it in NY; then a step S3 selects the color adjustment level of M and sets it in NM; a step S4 selects the color adjustment level of C and sets it in NC; a step S5 selects the color adjustment level of Bk and sets it in NBk; and a step S6 selects the gamma conversion table 24-1 in the color reproducing information storage unit 24, utilizing the values of Y, M, C and Bk in the NY, NM, NC and NBk.

Figure 4:
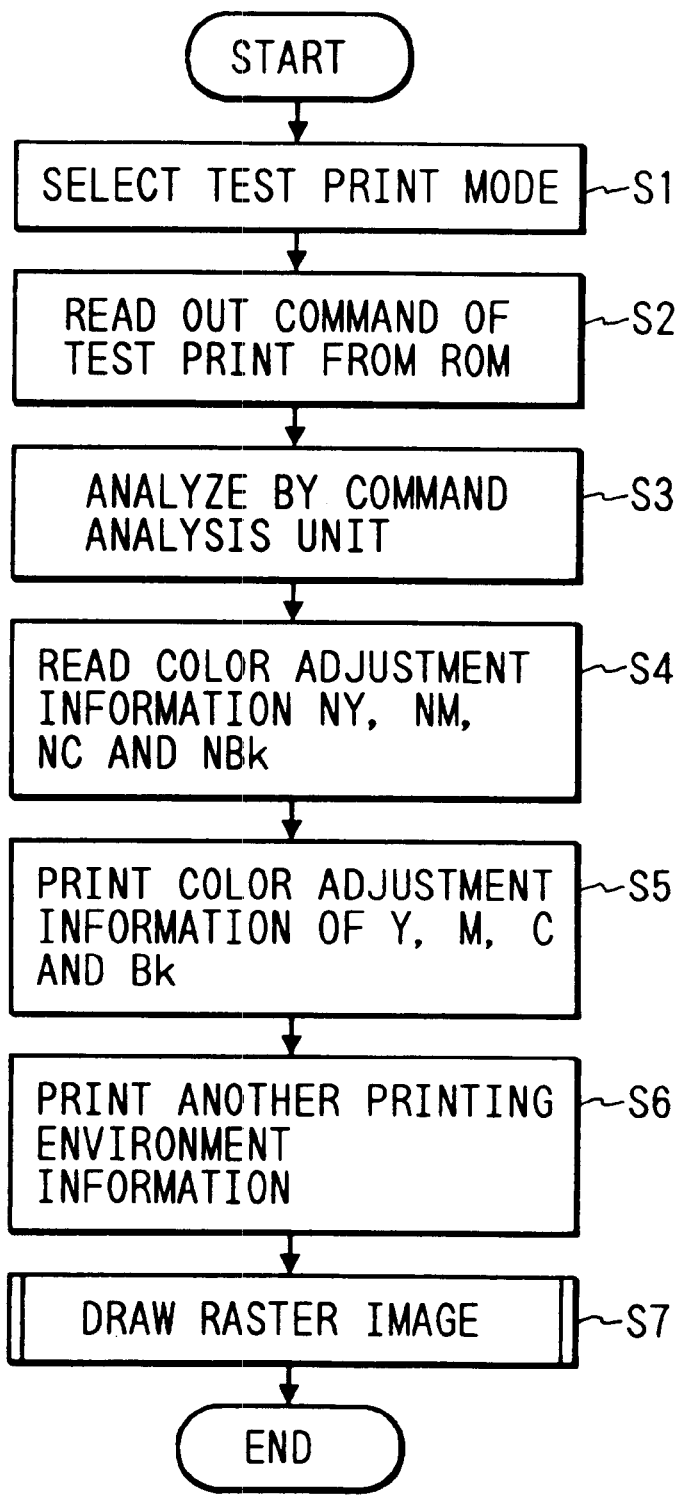
FIG. 4 is a flow chart for printing a test print.

FIG. 4 is a flow chart for executing a test print, when an instruction for test printing is provided by the host computer 1. A step S1 selects the test print mode; a step S2 reads a test print command from the test pattern storage unit 100; a step S3 analyzes said command in the command analysis unit; a step S4 sets the color adjustment level values NY, NM, NC and NBk in the color adjustment information set by the panel 23; then a step S5 effects test printing of color adjustment information or effects dot development of said information in the page information storage unit 27, in the same manner as a pattern A shown in FIG. 8; a step S6 effects dot development of other print information such as data B shown in FIG. 8, then effects color processing by the color reproduction process unit 25, according to the color adjustment state set by the panel 23 and effects printing in the output unit 2A or dot development in the information storage unit 27 as explained before; and a step S7 effects raster image writing.

Figure 5:
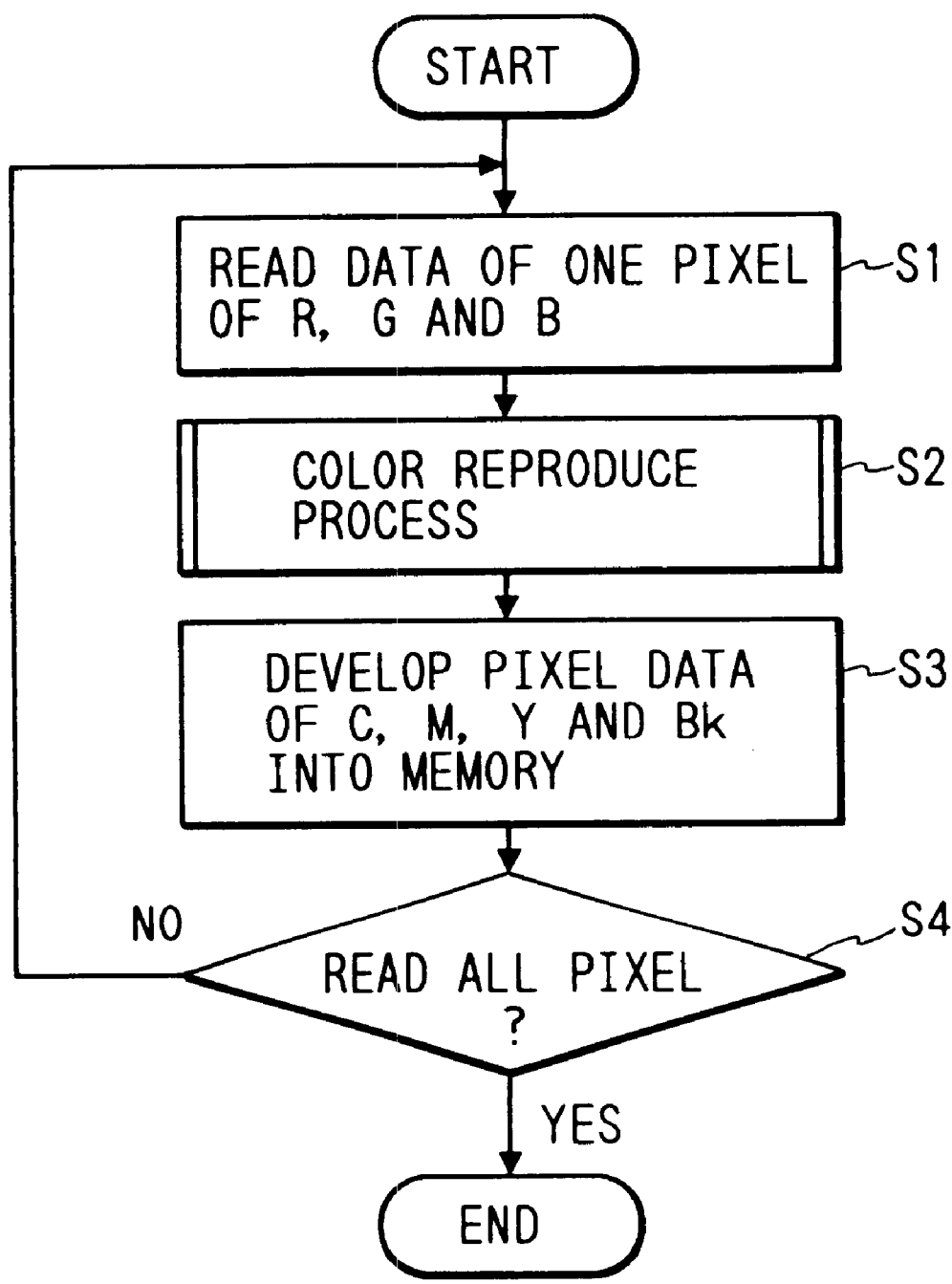
FIG. 5 is a flow chart for writing a raster image.

FIG. 5 is a flow chart of raster image writing. A step S1 reads the pixel data of R, G and B stored in the page information storage unit 28; a step S2 effects a color reproduction process, involving conversion from the R, G, B data into the Y, M, C, Bk data; a step S3 effects development of the pixel data of C, M, Y and Bk in the memory; a step S4 discriminates whether all the pixel data have been read, and, if read, this routine is terminated, but, if not, the sequence returns to the step S1.

Figure 7:
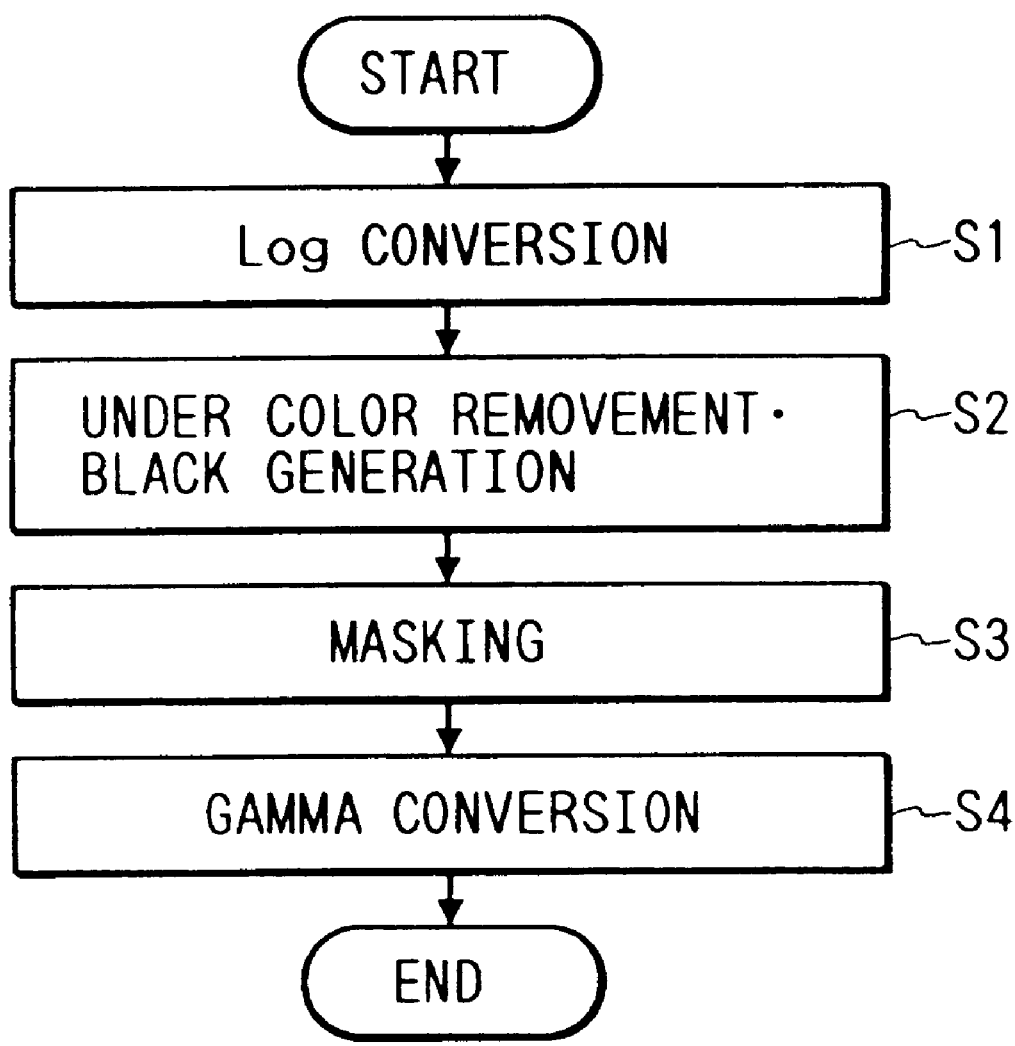
FIG. 7 is a flow chart for a color reproduction process.

FIG. 7 is a flow chart of the color reproduction process in the step S2 shown in FIG. 5. A step S1 effects logarithmic conversion from the R, G, B luminance signals into Y, M, C density signals; a step S2 effects undercolor removal and black color generation; a step S3 effects color masking; and a step S4 effects gamma conversion, with the density selected in the above-mentioned color adjustment mode. The data thus subjected to image processing are written into the development memory 29-1.

Figure 8:
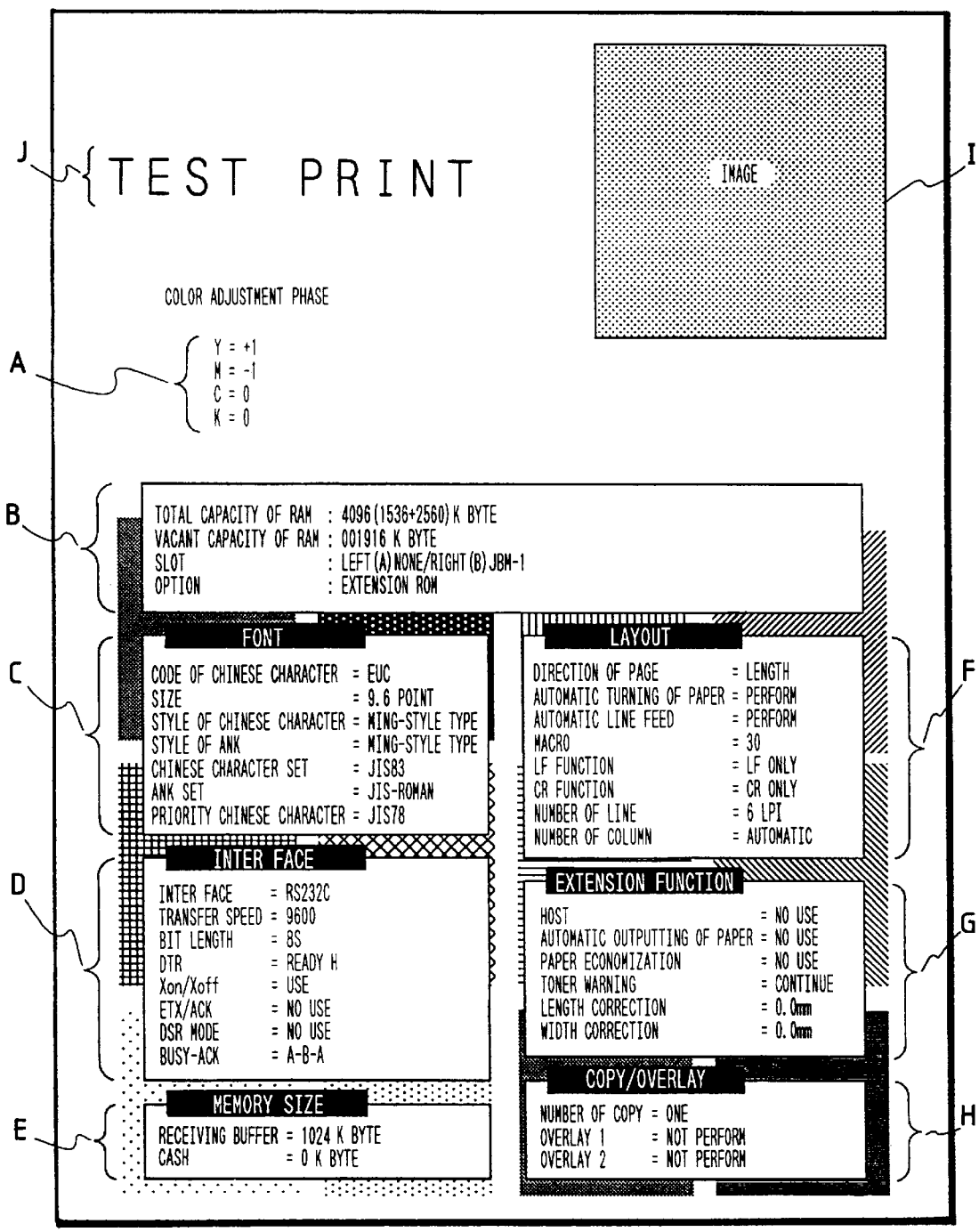
FIG. 8 is a view showing an example of the test pattern.

FIG. 8 illustrates an example of the test print prepared in this embodiment.

The print shown in FIG. 8 includes:

a pattern A indicating the color adjustment levels in numerical presentation for the four colors Y, M, C and K. The presentation may be made in a graphical form, or in any other form that allows visual confirmation of the color adjustment state;

an area B for printing information indicating the available memory capacity in the development memory 29-1, the page information storage unit, the page information analysis unit etc., the slot for inserting a font card and the available options;

an area C for printing information relating to the font;

an area D for printing information relating to the interface;

an area E for printing information relating to the memory size;

an area F for printing information relating to the layout;

an area G for printing information relating to the expanded functions;

an area H for printing information relating to the copy/overlay; and a color pattern I of plural colors, including gray scales of Y, M, C and K, of which density is regulated by the color reproducing process unit 25 shown in FIG. 1, according to the numerical values in A, whereby the selected color adjustment levels can be visually confirmed in the form of actual densities, in addition to the numerical representation.

In the following embodiment, there will be described an example of printing a color sample from the host computer, instead of printing data representing the test pattern.

The hardware configuration of the apparatus will not be explained as it is the same as explained before.

Figure 6:
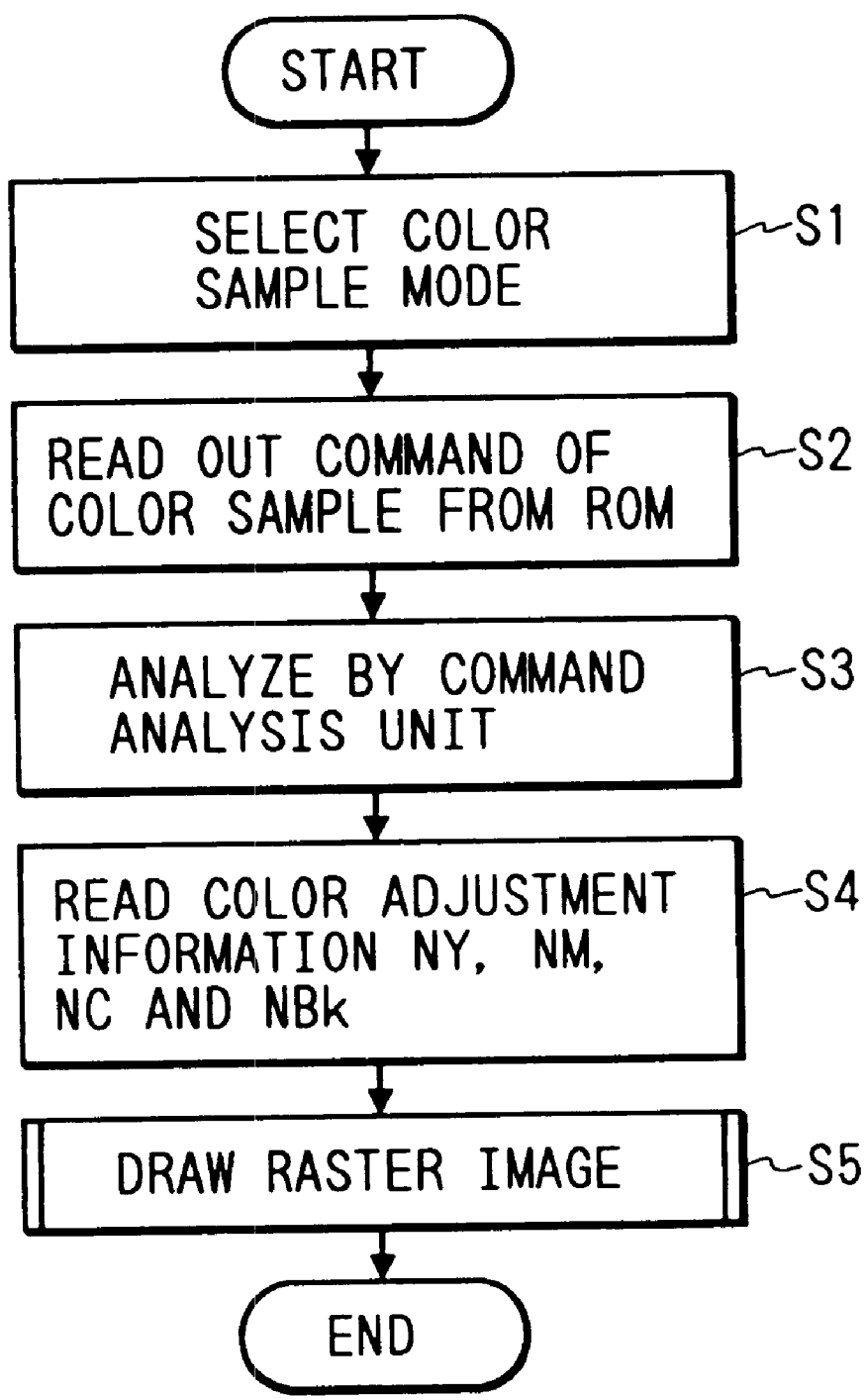
FIG. 6 is a flow chart for writing a color sample.
Figure 9:
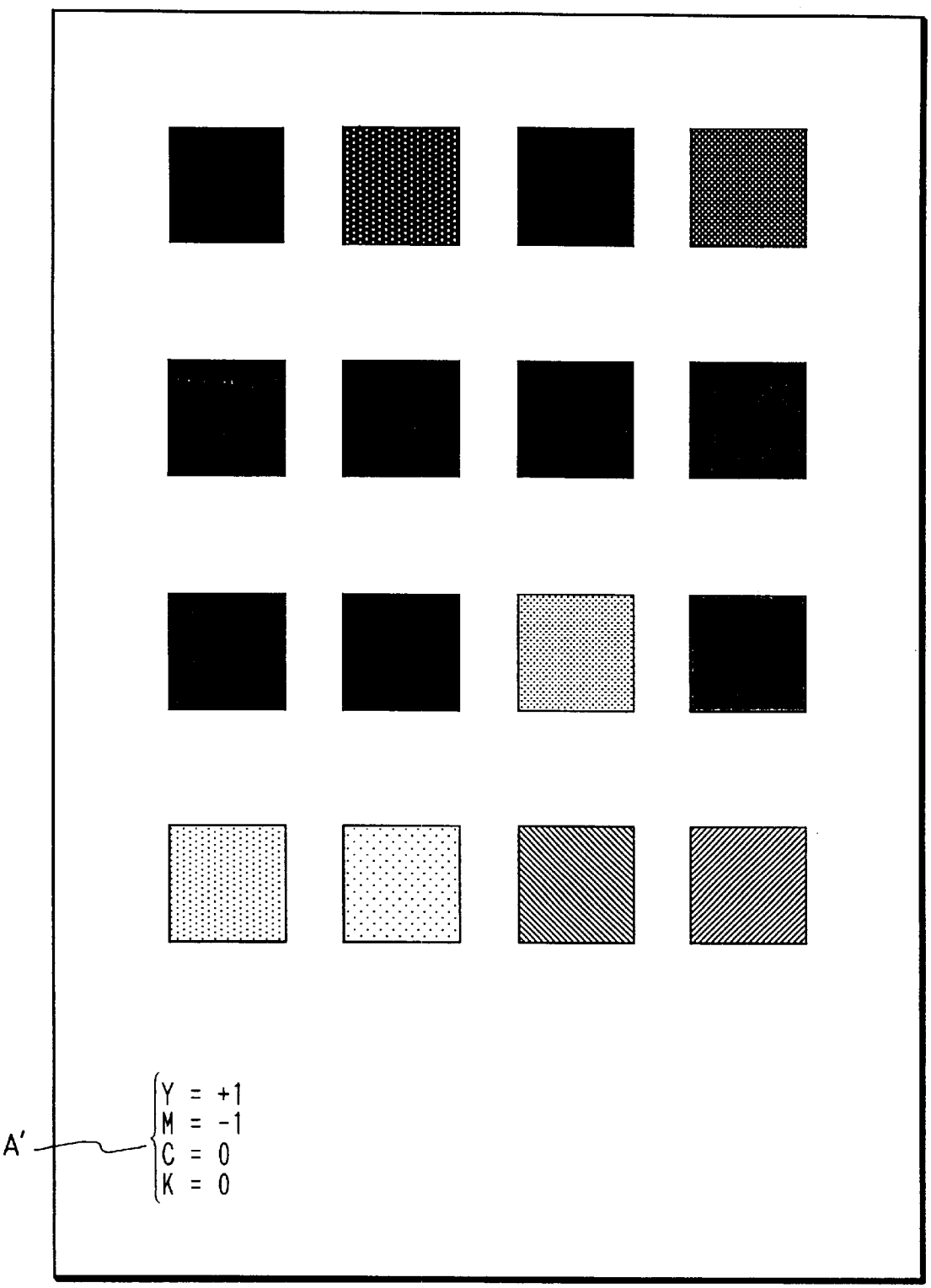
FIG. 9 is a view showing an example of the color sample.

FIG. 6 is a flow chart of the color sample printing. The color sample means a print of color palette data, provided in the apparatus, in a format as shown in FIG. 9, in which the square blocks indicate colors of mutually different hues. The color palette data show color numbers and color data of which combination of color components such as R, G and B is selected in advance, in correspondence with each of the color numbers. The correspondences between the color numbers and the combinations of the color component data can be varied by the host computer, and the color sample is printed in order to facilitate the understanding of such variable correspondences. Referring to FIG. 6, a step S1 selects the color sample mode; a step S2 reads a color sample command from the ROM: a step S3 analyzes the command in the command analysis unit; a step S4 sets the color adjustment levels NY, NM, NC and NBk as the color adjustment information; and a step S5 writes the raster image. FIG. 5 shows the flow of raster image writing, in which a step S1 reads the R, G and B data of a pixel; a step S2 effects the color reproducing process; a step S3 develops the pixels data of C, M, Y and Bk in the memory; and a step S4 discriminates whether all the pixel data have been read, and, if read, the raster image writing routine is terminated, but, if not, the sequence returns to the step S1.

In the embodiment shown in FIG. 9, the color adjustment levels A' may also be printed in a similar manner as the data A in FIG. 8.

In the present embodiment there has been explained an example of printing the color test pattern, but the present invention also includes the case of test pattern printing or sample printing of a monochromatic gray scale.

As described in the foregoing, in a printing apparatus capable of color printing and varying the print density, the present embodiment effects the color sample printing or the test printing with adjusted colors when the color density is adjusted, whereby the user can directly observe the changes in colors and understand the result of the color adjustment.

Also in such color sample printing or test printing, numerical data indicating the state of color adjustment are printed at the same time, and such numerical data are useful in varying the color adjustment state again.

Figure 10:
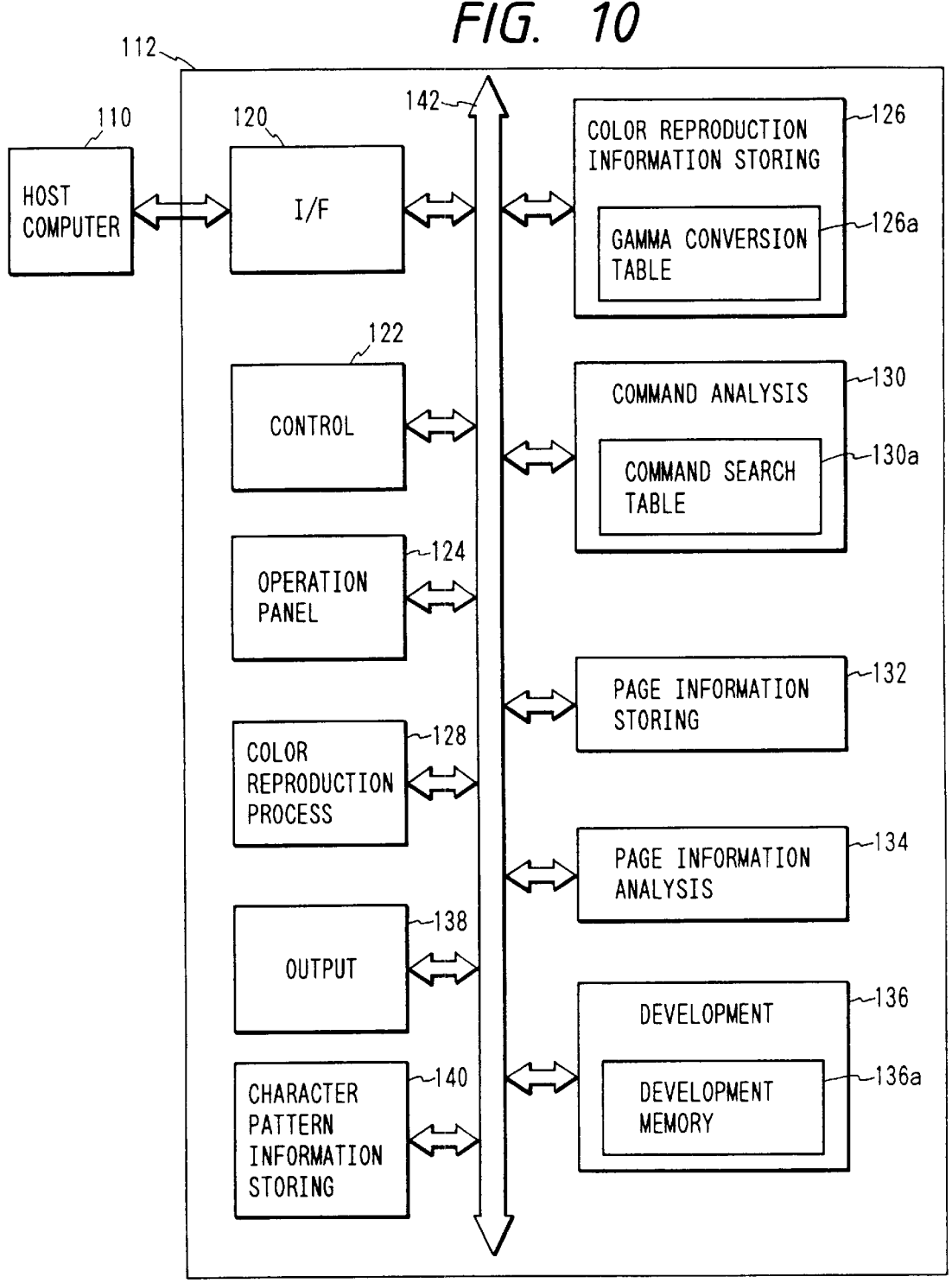
FIG. 10 is a block diagram of an embodiment of the present invention.

FIG. 10 shows another embodiment of the present invention, wherein a host computer 110 provides a color printer 112 of the present embodiment with print data.

The color printer 112 is provided therein with an interface 120 for receiving data (print data and control data) from the host computer 110; a control circuit (microcomputer) 122 for controlling the entire printer; and an operation panel 124 for entering the operation mode and various parameters into the control circuit 122.

A color reproducing information storage circuit 126 stores information required for color reproduction, in the form of gamma conversion tables $NY_1$, $NM_1$, $NC_1$, $NBk_1$; $NY_2$, $NM_2$, $NC_2$, $NBk_2$; $NY_3$, $NM_3$, $NC_3$, $NBk_3$ respectively for characters, images and character/images as will be explained later. A circuit 128 is provided for a color reproducing process.

A command analysis circuit 130, for analyzing the print data and control data from the host computer 110 and generating print information of a page (page information), is provided with a command table 130a storing jump addresses for the analysis programs corresponding to the print command numbers from the host computer 110.

A page information storage circuit 132, consisting of a RAM, serves to temporarily store the page information, obtained by the analysis in the command analysis circuit 130.

In the following there will be described an embodiment, in a color printing apparatus equipped with means for adjusting the output color density, enabling arbitrary density adjustment by the adjusting means at the test printing.

There are also provided a page information analysis circuit 134 for analyzing the page information stored in the page information storage circuit 132; a development circuit 136 for developing the information to be printed as an image on a development memory 136a, according to the result of analysis by the analysis circuit 134; an output circuit 138 for printing the bit map data, developed in the development memory 136a, on a recording sheet; and a character pattern information storage circuit 140 storing character pattern information of various characters.

Figure 17:
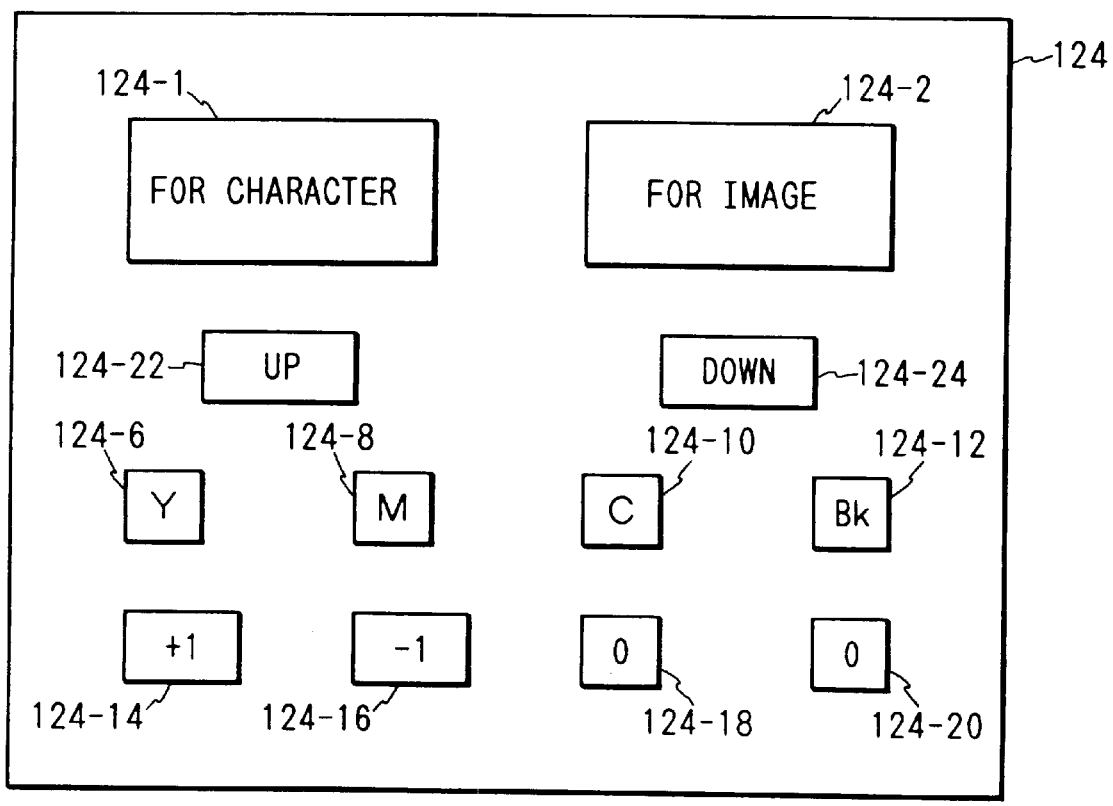
FIG. 17 is a view showing an example of the operation panel 124 shown in FIG. 10.

FIG. 17 is a view of the operation panel 124 shown in FIG. 10, wherein keys 124-1, 124-2 are provided for selecting the color adjustment modes for characters or for images; designations keys 124-6, 124-8, 124-10, 124-12 for designating the color components Y, M, C and Bk in the color adjustment modes; display units 124-14, 124-16, 124-18, 124-20 for displaying the density adjusted states of the Y, M, C and Bk colors; and keys 124-22, 124-24 for elevating and lowering the adjusted density levels of the Y, M, C and Bk colors.

The circuits 120–140 are mutually connected by a system bus 142.

Figure 11:
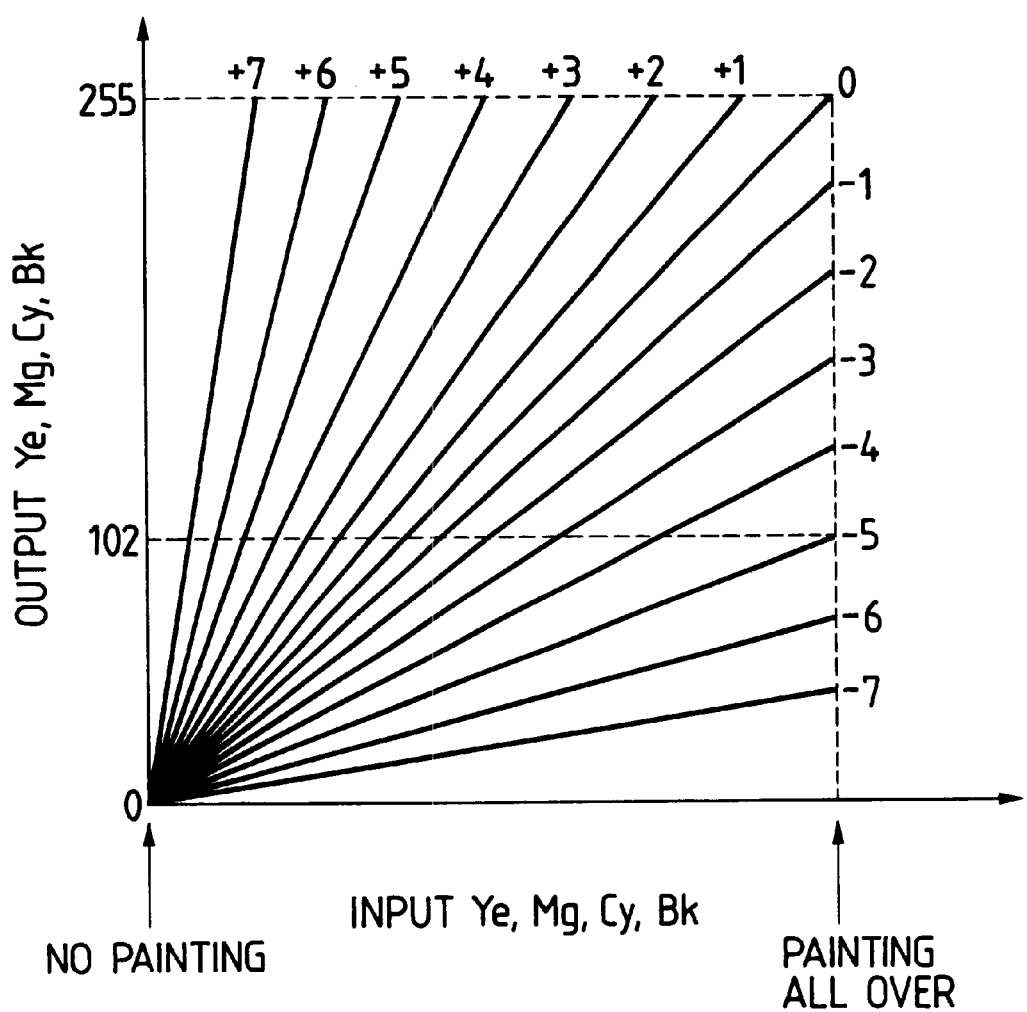
FIG. 11 is a chart showing gamma conversion characteristics.

The gamma conversion table 126a of the color reproducing information storage circuit 126 stores the information on the gamma conversion characteristics as shown in FIG. 11.

The characteristics are similar to those shown in FIG. 2, but are provided in a larger number in order to appropriately print the characters and images. The values of Y, M, C and Bk, obtained by processing the print data from the host computer 110, in 256 levels from a non-printed state "0" to a solid printed state "255", are converted within a range from 0 to 255. For example, for a parameter of −5 in FIG. 11, an input signal corresponding to the solid printed state is converted into an intermediate output signal at a level 102. Although FIG. 11 shows linear conversions, there may naturally be employed nonlinear conversions, and, for this reason the conversions shown in FIG. 11 are called gamma conversions.

Figure 12:
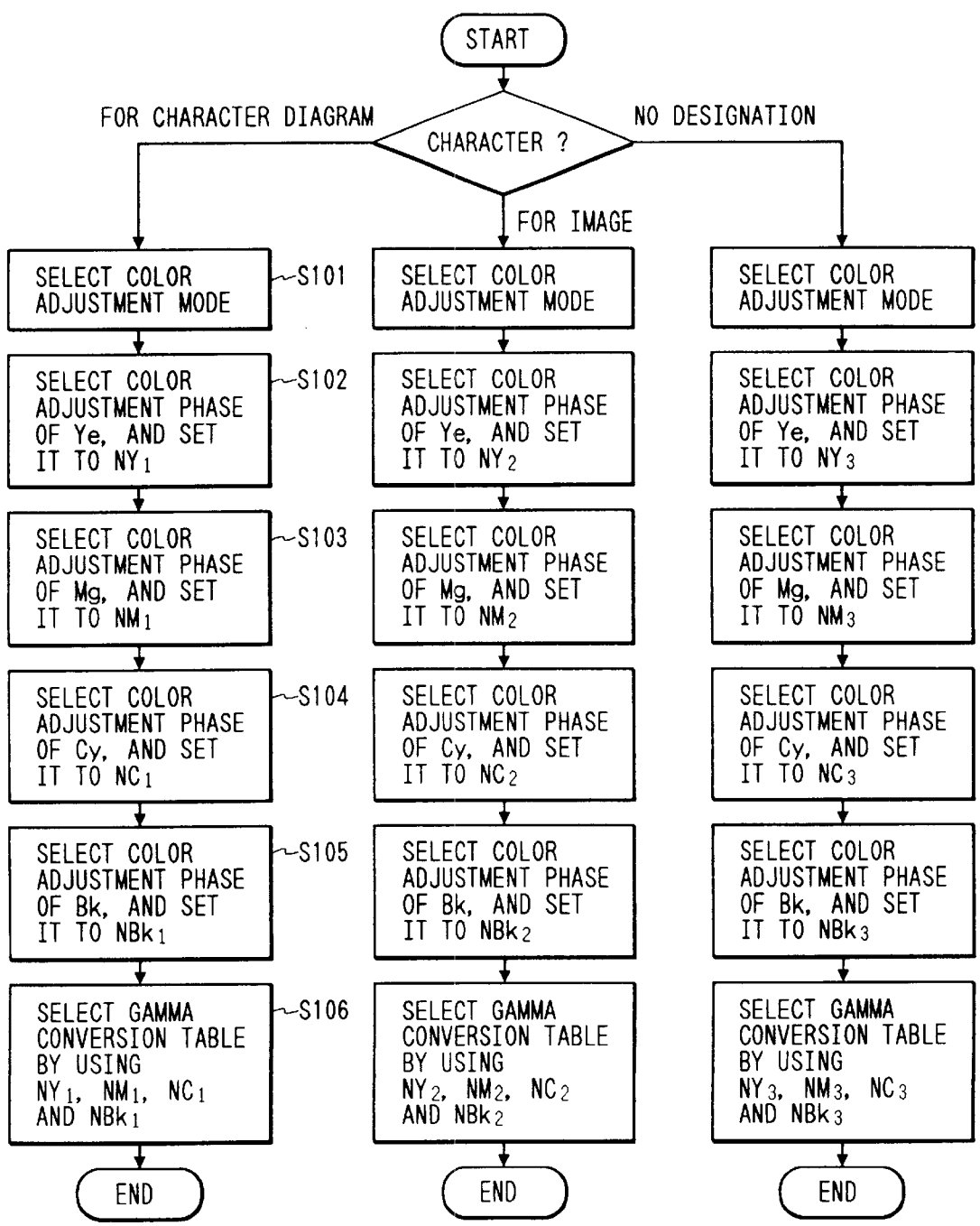
FIG. 12 is a flow chart for setting color adjustment parameters.

FIG. 12 shows a flow chart for setting the color adjustment values for Ye, Mg, Cy and Bk colors from the operation panel 124. The operator selects the color adjustment mode for characters or for images by actuating the key 124-1 or 124-2 on the operation panel 124 (step S101), and enters the color adjustment parameters for the Ye, Mg, Cy and Bk colors in succession, whereupon the control circuit 122 sets the entered parameters as variables $NY_1$, $NM_1$, $NC_1$ and $NBk_1$ for designating the gamma conversion tables (steps S102, S103, S104 and S105). The default value of said variables is "0". In the embodiment shown in FIG. 11, each of the entered parameters $NY_1$, $NM_1$, $NC_1$, $NBk_1$ assumes an integral value within a range from −7 to +7.

The control circuit 122 sets, for each color, a gamma conversion table among those 126a, according to the parameters $NY_1$, $NM_1$, $NC_1$, $NBk_1$ entered from the operation panel 124 (step S106). Also the operator in advance designates the character patterns or images as the object of color adjustment at the test printing, to the control circuit 122 through the operation panel 124. Thus, a selection can be made as to whether to apply a same color adjustment or different color adjustments to the character and images.

Figure 13:
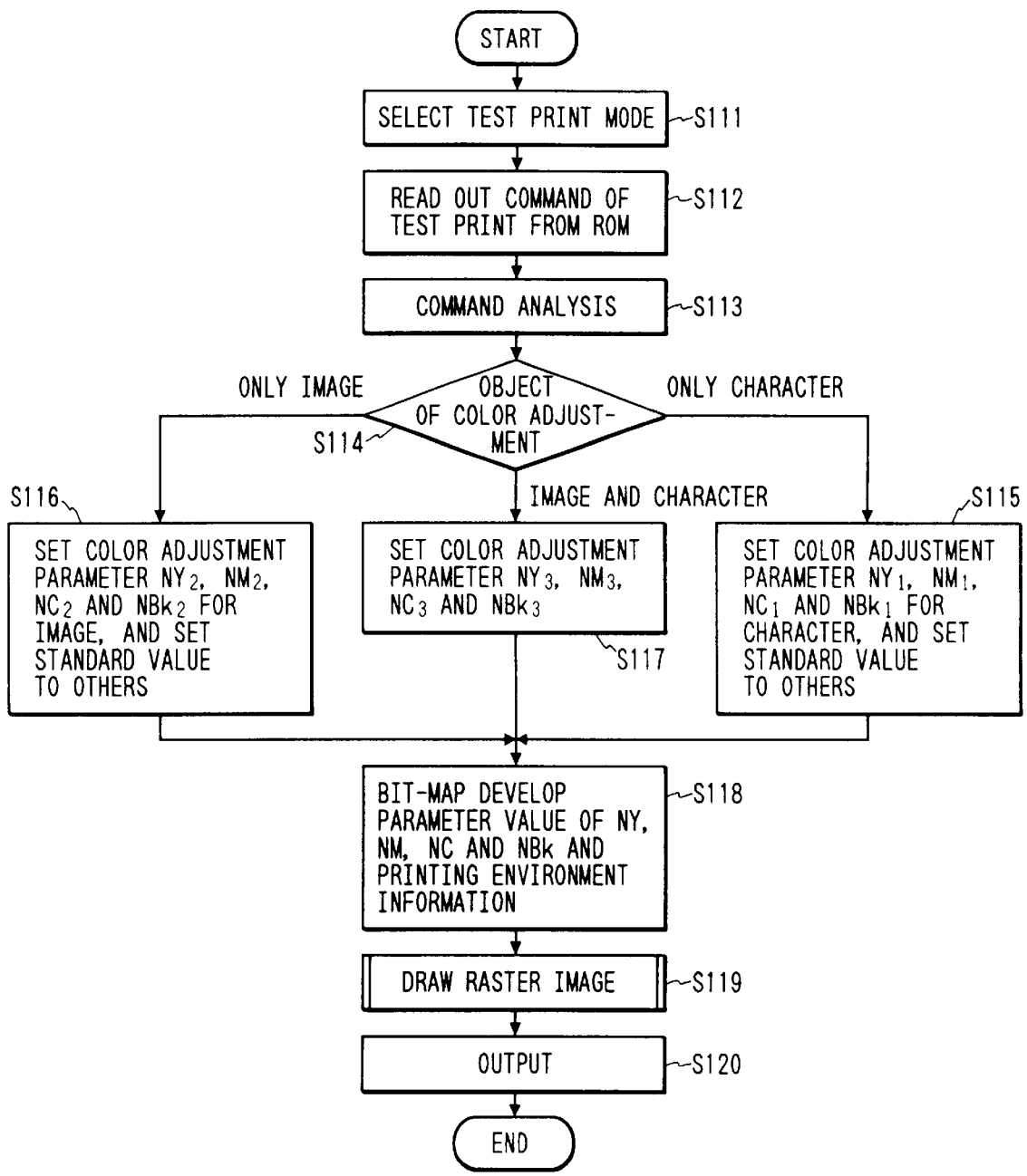
FIG. 13 is a flow chart for a test print.

FIG. 13 is a flow chart of the test printing sequence. In this example, the color adjustment can be applied to the characters only, the test image only or both.

According to the selection of the test print mode by the operator through the operation panel 124 (step S111), the control circuit 122 reads the test print command from the unrepresented ROM (step S112), and supplies the command to the command analysis circuit 130, which analyzes said test print command (step S113).

If the color adjustment is designated for the characters only in the test print image represented by the test print command (step S114), the character printing color information is subjected to gamma conversion utilizing the color adjustment parameters $NY_1$, $NM_1$, $NC_1$, $NBk_1$ set in the sequence shown in FIG. 11, but the color adjustment is not applied to other images (step S115).

Also if the color adjustment is designated for the images only (step S114), the image printing color information is subjected to the gamma conversion utilizing the color adjustment parameters $NY_2$, $NM_2$, $NC_2$, $NBk_2$ set in the sequence shown in FIG. 11 but the color adjustment is not applied to the characters (step S116).

In case the color adjustment is applied to both of the characters and the images, or in case no separate color adjustments are designated for the characters and the images (step S114), the printing color information for both is subjected to the gamma conversion, utilizing the parameters $NY_3$, $NM_3$, $NC_3$, $NBk_3$ set in the sequence shown in FIG. 11.

After the steps S115, S116 and S117, the printing condition information, including the set color adjustment parameters $NY, NM, NC, NBk$, is developed into a bit map in the development memory 136a, and the image of test print is converted into raster data and stored in a predetermined portion (for example an area different from the area for the printing condition information) in the development memory 136a (step S119). Then the data stored in the development memory 136a are supplied to the output circuit 138 and printed on the recording sheet (step S120).

Figure 14:
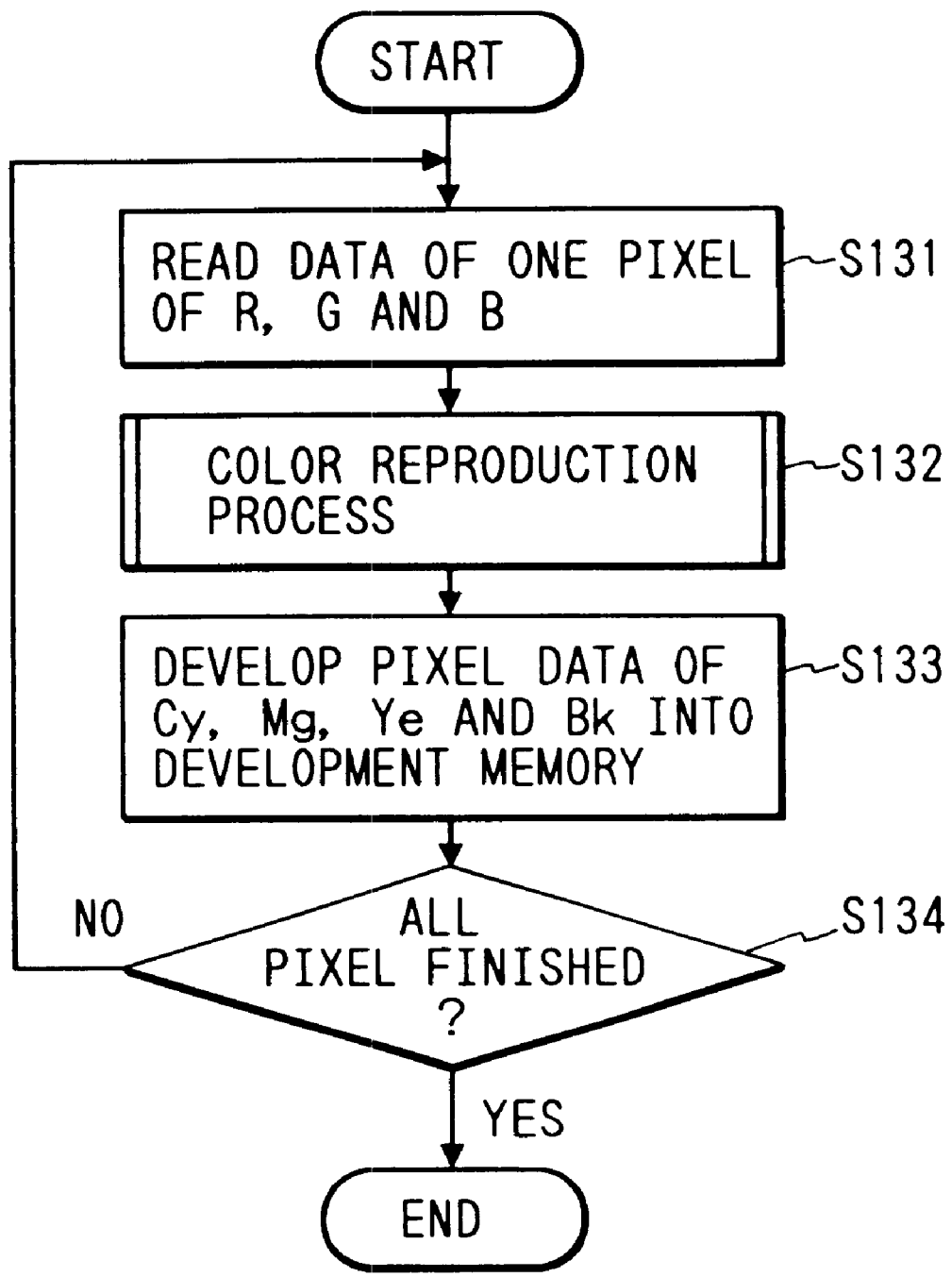
FIG. 14 is a flow chart showing details of a step S119 in FIG. 13.

FIG. 14 is a flow chart showing the details of the step S119 in FIG. 13. A step S131 reads the R, G and B data of a pixel, then a step S132 effects the color reproducing process by the color reproducing process circuit 128 and conversion into the C, M, Y and Bk data, and a step S133 stores the data in predetermined areas of the development memory. After the steps S131, S132 and S133 are executed for all the pixels, the sequence returns to the flow shown in FIG. 13.

If separate color adjustments are designated for the characters and the images in this embodiment, the step S132 identifies the corresponding command and utilizes the color adjustment parameters $NY_1, NM_1, NC_1, NBk_1$ for the development of characters and parameters $NY_2, NM_2, NC_2, NBk_2$ for the development of images. This point defines the difference from the flow chart shown in FIG. 5.

Figure 15:
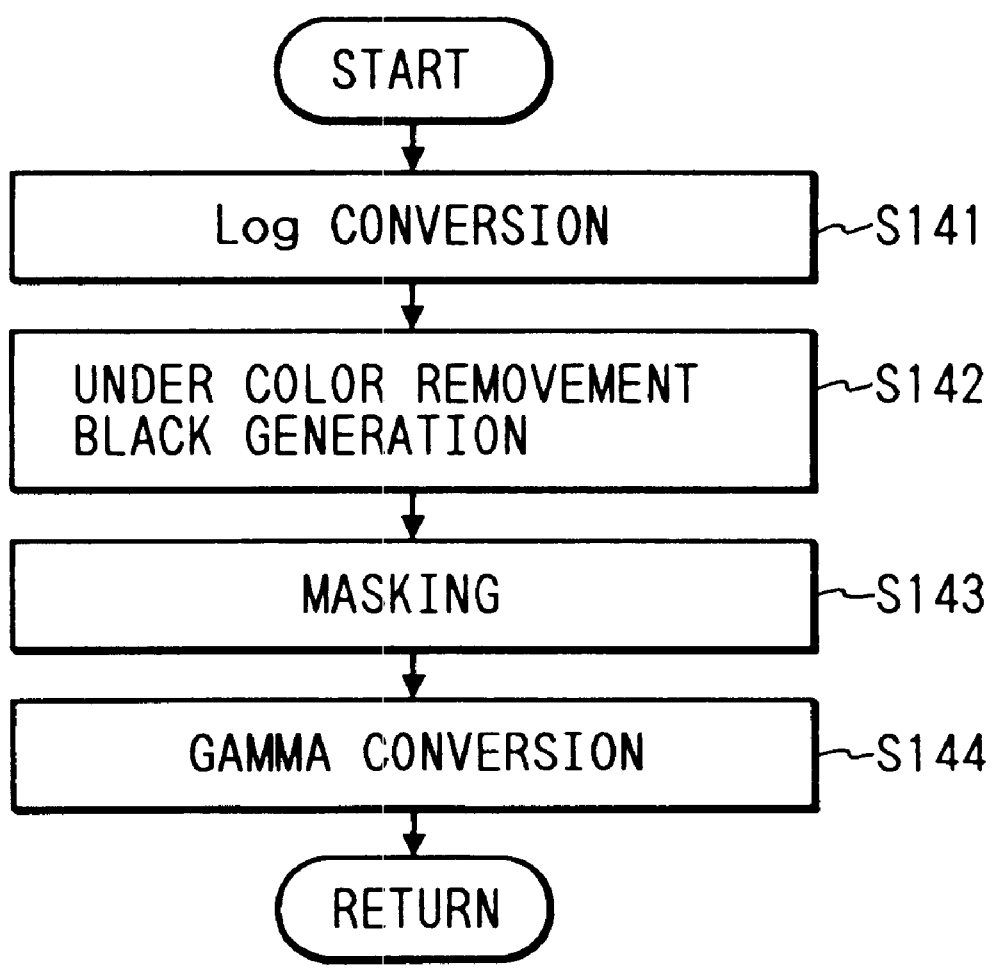
FIG. 15 is a flow chart showing details of a step S132 in FIG. 14.

FIG. 15 is a flow chart showing details of the color reproducing process in the step S132 shown in FIG. 14. The R, G, B luminance data are logarithmically converted into C, M, Y density data (S141), and a black signal is generated with the removal of undercolor (S142). Then masking is conducted (S143), and gamma conversion is executed by the table 26a (S144).

Figure 16:
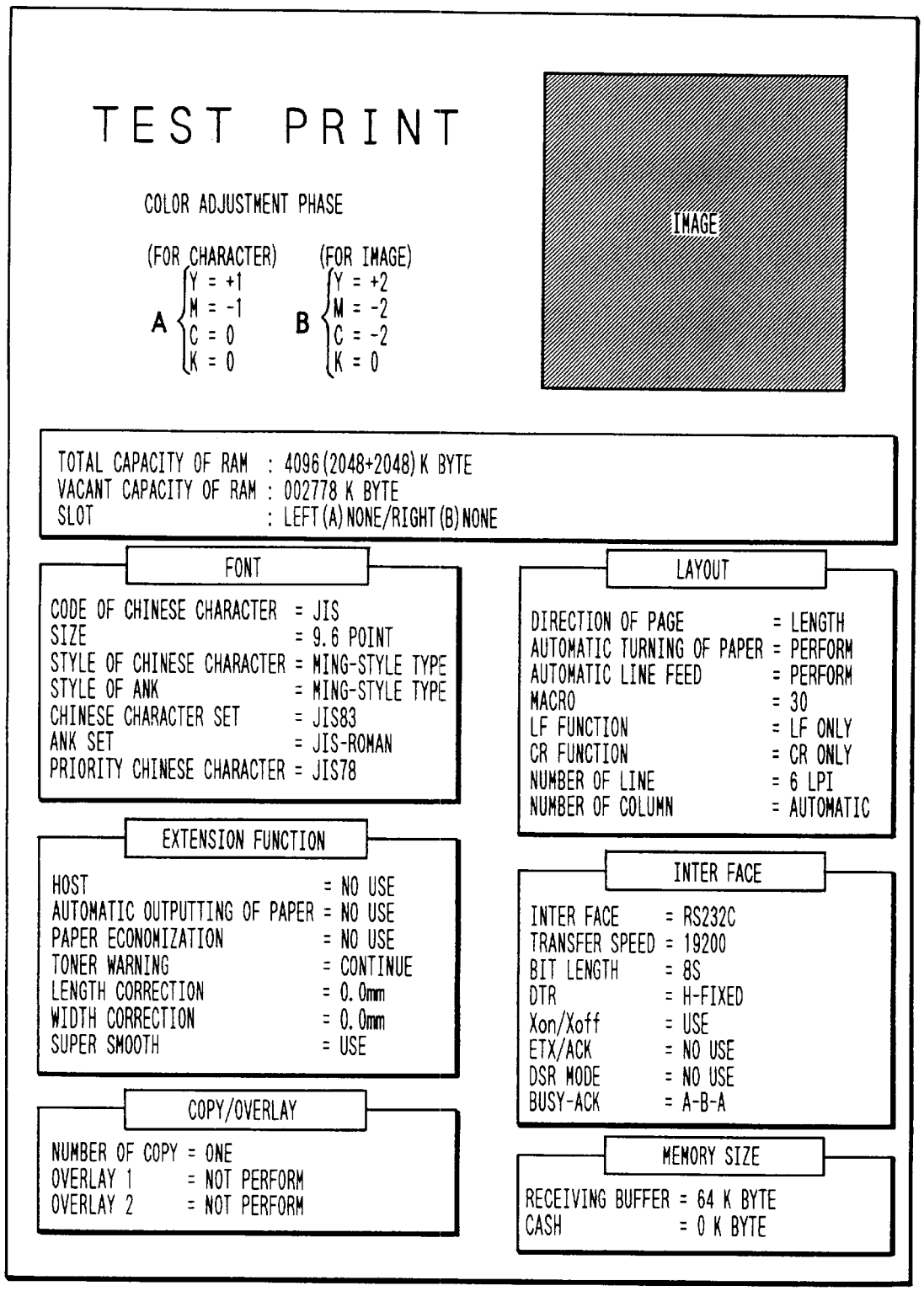
FIG. 16 is a view showing the result of a test print of the present embodiment.

FIG. 16 shows an example of a test print obtained in the apparatus of the present embodiment. Different from the example shown in FIG. 8, there are printed parameters A for the characters only, and B for the image only, together with the test print image. Consequently the user can recognize the state of test print in numerical presentation.

The image for such test print may naturally be replaced by a suitable test pattern.

As explained in the foregoing, the present embodiment allows to confirm the results of color adjustments for the characters and for the image, in the actual printed colors.

What is claimed is:

1. An image processing apparatus comprising:
   input means for inputting a color image formed from a plurality of color components;
   setting means for an operator to regulate a color change of the input color image by selectively setting density adjustment values for the plurality of color components of the input color image;
   forming means for forming density data indicative of the set density adjustment values of the plurality of color components of the input color image;
   density conversion means for converting density levels of the plurality of color components of the input color image in accordance with the density adjustment values selectively set by said setting means;
   color-process means for color-processing the input color image on the basis of the converted density levels of the plurality of color components to form a test color image; and
   a printer for printing the test color image and the density data on a recording medium,
   wherein the operator evaluates a color change to the input color image by viewing the printed test color image and density data to determine if further color change is needed by changing the set density adjustment values indicated by the printed density data.

2. An image processing method comprising:
   an input step of inputting a color image formed from a plurality of color components;
   a setting step of selectively setting by an operator density adjustment values for the plurality of color components of the input color image to regulate color change of the input color image;
   a forming step of forming density data indicative of the set density adjustment values of the plurality of color components of the input color image;
   a density conversion step of converting density levels of the plurality of color components of the input color image in accordance with the density adjustment values selectively set by said setting step;
   a color-processing step of color-processing the input color image on the basis of the converted density levels of the plurality of color components to form a test color image;
   a printing step of printing the test color image and the density data on a recording medium; and
   an evaluating step of evaluating by the operator a color change to the input color image by viewing the printed test color image and density data to determine if further color change is needed by changing the set density adjustment values indicated by the printed density data.

3. An image processing apparatus comprising:
   a) setting means for manually setting a conversion condition;
   b) generating means for generating a test image signal;
   c) conversion means for converting the test image signal on a basis of the set conversion condition; and
   d) image forming means for forming a test image based on the converted test image signal and a pattern representing the conversion condition, and a pattern representing a state of an image forming unit, on one medium by using the image forming unit,
   wherein an operator evaluates a color change to the test image by viewing the printed test image and the pattern representing the conversion condition to determine if further color change is needed by changing the conversion condition represented by the pattern.

4. An apparatus according to claim 3, further comprising: memory means for storing the test image signal.

5. An apparatus according to claim 3, wherein the test image is a gray image.

6. An apparatus according to claim 3, wherein the test image is a gray scale image of each color of YMCK.

7. An image processing apparatus which has a conversion condition corresponding to each of plural image types and executes a color conversion by using the conversion condition corresponding to an image type of an input image, said apparatus comprising:
   adjusting means for adjusting the conversion condition;
   designation means for manually designating the conversion condition for each of the plural image types; and
   test image output means for outputting on one recording medium by using an image forming unit, a test image corresponding to each of plural image types which is color coverted by the designated conversion condition for each of the plural image types and a pattern representing the designated conversion condition for each of the plural image types, wherein an operator evaluates a color change to the test image by viewing the printed test image corresponding to each of the plural image types and the pattern representing the conversion condition corresponding to each of the plural image types to determine if further color change is needed by changing the conversion condition for each of the plural image types.

8. An apparatus according to claim 7, wherein the image type includes at least one of character, photograph and figure.

9. An apparatus according to claim 7, wherein said adjusting means includes selecting means for selecting the image type to designate the conversion condition, wherein said designating means designates the conversion condition corresponding to the selected image type.

10. An apparatus according to claim 7, wherein the pattern includes a pattern representing a numeric value indicating a degree of the designated conversion condition.

11. An image processing method comprising:
 a) a setting step of manually setting a conversion condition;
 b) a generating step of generating a test image signal;
 c) a conversion step of converting the test image signal on a basis of the set conversion condition; and
 d) an image forming step of forming a test image based an the converted test image signal and a pattern representing the conversion condition, and a pattern representing a state of an image forming unit, on one medium by using the image forming unit,
 wherein an operator evaluates a color change to the test image by viewing the printed test image and the pattern representing the conversion condition to determine if further color change is needed by changing the conversion condition represented by the pattern.

12. An image processing method which has a conversion condition corresponding to each of plural image types and executes a color conversion by using the conversion condition corresponding to an image type of an input image, said method comprising:
 an adjusting step of adjusting the conversion condition;
 a designation step of manually designating the conversion condition for each of the plural image types; and
 a test image output step of outputting on one recording medium by using an image forming unit, a test image corresponding to each of plural image types which is color converted by the designated conversion condition for each of the plural image types and a pattern representing the designated conversion condition for each of the plural image types,
 wherein an operator evaluates a color change to the test image by viewing the printed test image corresponding to each of the plural image types and the pattern representing the conversion condition corresponding to each of the plural image types to determine if further color change is needed by changing the conversion condition for each of the plural image types.

* * * * *

UNITED STATES PATENT AND TRADEMARK OFFICE
CERTIFICATE OF CORRECTION

PATENT NO. : 6351,263 B1
DATED : February 26, 2002
INVENTOR(S) : Kazuya Naoi

It is certified that error appears in the above-identified patent and that said Letters Patent is hereby corrected as shown below:

Drawings,
Sheet 5, Figure 5, "ALL PIXEL" should read -- ALL PIXEL DATA --.
Sheet 13, Figure 13, "PARAMETER" (first three occurrences) should read
-- PARAMETERS --.
Sheet 14, Figure 14, "PIXEL FINISHED" should read -- PIXELS FINISHED --.

Column 4,
Line 56, "pixels" should read -- pixel --.

Column 9,
Line 25, "an" (second occurrence) should read -- on --.

Signed and Sealed this

Twenty-second Day of April, 2003

JAMES E. ROGAN
*Director of the United States Patent and Trademark Office*